(12) United States Patent
Kim

(10) Patent No.: US 7,199,839 B2
(45) Date of Patent: Apr. 3, 2007

(54) COLOR SIGNAL PROCESSING DEVICE FOR MULTI-PRIMARY COLOR DISPLAY AND METHOD THEREOF

(75) Inventor: Moon-cheol Kim, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 627 days.

(21) Appl. No.: 10/241,695

(22) Filed: Sep. 12, 2002

(65) Prior Publication Data
US 2003/0098928 A1     May 29, 2003

(30) Foreign Application Priority Data
Nov. 28, 2001   (KR)  ............................. 2001-74697

(51) Int. Cl.
*H04N 6/69*   (2006.01)
(52) U.S. Cl. .................. 348/675; 348/649; 348/642; 345/604
(58) Field of Classification Search ........ 348/642–658, 348/675, 649, 187–191; 358/519; 382/167; 345/604; *H04N 9/69*
See application file for complete search history.

(56) References Cited

U.S. PATENT DOCUMENTS

| | | | |
|---|---|---|---|
| 2,282,928 A | | 5/1942 | Bauer et al. |
| 4,379,292 A | * | 4/1983 | Minato et al. ............... 345/603 |
| 5,953,449 A | * | 9/1999 | Matsuda et al. ............. 382/162 |
| 6,262,744 B1 | * | 7/2001 | Carrein ....................... 345/604 |
| 6,538,742 B1 | * | 3/2003 | Ohsawa ....................... 356/405 |
| 6,633,302 B1 | * | 10/2003 | Ohsawa et al. ............. 345/604 |
| 6,639,628 B1 | * | 10/2003 | Lee et al. ................. 348/223.1 |
| 6,870,523 B1 | * | 3/2005 | Ben-David et al. ........... 345/84 |

FOREIGN PATENT DOCUMENTS

| | | |
|---|---|---|
| JP | 9-135316 | 5/1997 |
| JP | 2001-60082 | 3/2001 |

OTHER PUBLICATIONS

Japanese Office Action Issued on Oct. 25, 2005 with respect to the Japanese Patent Application No. 2002-320310.

* cited by examiner

*Primary Examiner*—Trang Tran
(74) *Attorney, Agent, or Firm*—Staas & Halsey LLP

(57) ABSTRACT

A color signal processing apparatus for a multi-primary display with a simple circuit construction and a color signal processing method achieves a display white by more than four display primaries. The color signal processing apparatus has a tristimulus value calculation unit calculating tristimulus values (X, Y, Z) of an input color signal, a display primary control signal calculation unit calculating a control signal of each display primary to represent the color signal with a number of display primaries, and a control unit setting the control signal of each display primary with the control signal calculated by the display primary control signal calculation unit to display the color signal. Accordingly, the color signal processing apparatus for the multi-primary display is not only being capable of achieving the display white by more than the four display primaries but also can display the color signals of the entire color gamut according to the number of display primaries being provided and the settings for the respective color coordinates.

31 Claims, 5 Drawing Sheets

COLOR SIGNAL PROCESSING DEVICE FOR MULTI-PRIMARY COLOR DISPLAY AND METHOD THEREOF

CROSS-REFERENCE TO RELATED APPLICATION

This application claims the benefit of Korean Application No. 2001-74697, filed Nov. 28, 2001, in the Korean Industrial Property Office, the disclosure of which is incorporated herein by reference.

BACKGROUND OF THE INVENTION

1. Field of the Invention

The present invention relates to an apparatus for and a method of processing a color signal inputted to a display, and more particularly, to an apparatus and a method that contribute to a color homogeneousness by obtaining an accurate channel control signal in response to an input color signal and use the obtained signal for a display.

2. Description of the Related Art

FIG. 1 shows CIE-xy color (chromaticity) coordinates. The CIE color coordinates are a two-dimensional graph having x and y axes. A hoof line 1 curved in a shape of a horse's hoof represents monochromatic waves of a visible spectrum that ranges from 360 nm to 830 nm. Colors included in the hoof line 1 are perceivable by human eyes.

Selecting two basic colors from an inside of the hoof line 1 at random and blending the selected colors results in a color lying on a line segment connecting two points which represent the selected colors on the CIE-xy coordinates. Selecting three basic colors from the inside of the hoof line 1 at random and blending the selected three colors results in a color lying within a triangle connecting three points that represent the selected three colors on the CIE-xy coordinates.

A conventional display system that has three primary colors, i.e., red (R), green (G) and blue (B), can only display the colors within the triangle connecting the RGB on the CIE-xy coordinates. Accordingly, such a display system cannot display natural colors outside the RGB triangle.

In order to solve the above-mentioned problem, a color processing apparatus having a new display system that has more than three primary colors was developed as disclosed in U.S. Pat. No. 6,262,744.

FIG. 2 is a view showing a conventional color driving method in a display system that has four primary colors (display primaries). Referring to FIG. 2, the display system having four display primaries R, G, B and D can only display colors within a convex polygon of RGBD.

That is, when the number of primaries (n) is 4, and when the number of channels k for a signal transmission to the display system is 3, the display system performs a color display by moving (switching) from the conventional display system containing three tristiumus values (X, Y, Z) to the new display system having four display primaries (R, G, B, D). After being coded in a coding process, each signal is transmitted through corresponding one of the three channels. In this case, each of the three channels transmits the signal of at least one primary color during the coding process, i.e., (n/k)=(4/3)=1. Next, since (n % k)=(4% 3)=1, one of the three channels transmits the signals of the two primary colors. Here, (n % k) is a remainder after dividing n by k.

When the four primary colors (R, G, B, D) are designated in the CIE-xy coordinates, a range of the display system having the four primary colors (R, G, B, D) is determined by points within a convex quadrilateral of RGBD. When the tristimulus values (Xi, Yi, Zi) are appropriately determined, the standardized CIE-xy coordinates can be calculated. That is, the CIE-xy coordinates are obtained by the following mathematical equation 1:

$$x_i = \left(\frac{X_i}{X_i + Y_i + Z_i}\right)$$
$$y_i = \left(\frac{Y_i}{X_i + Y_i + Z_i}\right).$$

Equation 1

Next, by substituting the CIIE-xy coordinates for the color coordinates of the displayed point $(x_i, y_i)$ and the color coordinates of an auxiliary primary color D in the following equation 2, a location of a displayed point $(x_i, y_i)$ is compared with that of the auxiliary primary color D:

$$y' = y_b + \left(\frac{y_g - y_b}{x_g - x_b}\right) \times (x_i - x_b) - y_i$$
$$y'' = y_b + \left(\frac{y_g - y_b}{x_g - x_b}\right) \times (x_d - x_b) - y_d$$

Equation 2 where $Y_R=0$ when y' and y" are equal to or greater than zero (0), and $Y_D=0$ when y' and y" are less than zero (0).

Next, points $(x_1, y_1)$ and $(x_2, y_2)$ on the CIE-xy coordinates are obtained. Here, a point $(x_1, y_1)$ exists within the triangle of three primaries B, G and D, and a point $(x_2, Y_2)$ exists in the triangle of three primaries R, G and B. In other words, the point $(x_1, y_1)$ exists on a left-hand side of a principal line GB (when y' and y" are equal to or are greater than zero), and the point $(x_2, y_2)$ exists on a right-hand side of the principal line GB (when y' and y" are less than zero). Accordingly, driving signals to display the points $(x_1, y_1)$ and $(x_2, y_2)$ are obtained by the following equation 3:

1) $Y_D = 0$, $$\begin{bmatrix} Y_R \\ Y_G \\ Y_B \end{bmatrix} = \begin{bmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{bmatrix}^{-1} \cdot \begin{bmatrix} X_i \\ Y_i \\ Z_i \end{bmatrix}$$

2) $Y_R = 0$, $$\begin{bmatrix} Y_D \\ Y_G \\ Y_B \end{bmatrix} = \begin{bmatrix} \frac{x_d}{y_d} & \frac{x_g}{y_g} & \frac{x_b}{y_b} \\ 1 & 1 & 1 \\ \frac{z_d}{y_d} & \frac{z_g}{y_g} & \frac{z_b}{y_b} \end{bmatrix}^{-1} \cdot \begin{bmatrix} X_i \\ Y_i \\ Z_i \end{bmatrix}.$$

Equation 3

Since display primaries R and D are non-coincident (mutually exclusive), the driving signals of the display primaries R and D are not simultaneously driven. In other words, the channel that transmits the signal of the display primary R to the display system also transmits the signal of the display primary D.

FIG. 3 is a view showing another conventional color driving method of the display system that has five primary colors. Referring to FIG. 3, n=5 and k=3, that is, the number of the display primaries (n) is five (5), and the number of the channels (k) is three (3). In this case, a transition is made from the conventional display system that has the tristimulus values (X, Y, Z) to another new display system having five display primaries. After being coded in the coding process, the signals are transmitted through the three channels, respectively. Here, since (n/k)=(5/3)=1, each channel transmits the signal of at least one primary color during the coding process. Also, since (n % k)=(5% 3)=2, two of the three channels transmit the signals of the two display primary colors. The color range of the display system having the five primary colors R, G, B, D1 and D2 is determined by points located within a convex polygon of R, D1, G, D2, B.

Three principal primary colors R, G, B are selected from the five colors R, G, B, D1 and D2, and the two auxiliary primary colors D1 and D2 are selected such that D1 and D2 are evenly distributed among the principal primary colors R, G, B, that is, one auxiliary primary color is located between the two principal primary colors. For example, the auxiliary primary color D1 is selected to be located between the principal primary colors R and G, and the auxiliary primary color D2 is selected to be located between the principal primary colors G and B. The location of the point $(x_3, y_3)$ and the location of the point $(x_4, y_4)$ are obtained by using the selected D1 and D2 through the equations 1, 2 and 3. That is, resultant values of substituting the CIE-xy coordinates for a coordinate value of a point $(x_3, y_3)$ in the equation of another line RG, and substituting a coordinate value of a point $(x_4, y_4)$ in the equation of the line GB, are substituted in the equations 1, 2 and 3, to obtain the points $(x_3, y_3)$ and $(x_4, y_4)$.

As described above, a conventional color signal processing apparatus of the display system adopts the method of selecting and converting a transformation matrix that belongs to a range within the input color signals of the display primary colors R, G, B in order to obtain the channel control signal for a display. This method, however, requires hardware having a rather complicated circuit unit obtaining a (N−2) number of transformation matrixes if the number of channels N is is equal to or greater than 3. Further, since this method always reproduces a certain color signal through a combination of three signals, the display system does not have a color range that has the entire gamut of reproducible colors. Particularly, since the luminance of a display white has an intensity that needs three channels to be displayed at maximum, the display white by more than four primary colors cannot be obtained.

SUMMARY OF THE INVENTION

The present invention has been made to overcome the above and other problems of the related art, and accordingly, it is an object of the present invention to provide a color signal processing apparatus for a multi-primary color display with a simple circuit structure capable of achieving a display white with more than four primary colors and a method using the same.

Additional objects and advantages of the invention will be set forth in part in the description which follows and, in part, will be obvious from the description, or may be learned by practice of the invention.

The above and other objects are achieved by providing a color signal processing device of a multi-primary color display according to an embodiment of the present invention. The color signal processing device includes a gamma characteristic storage unit storing a gamma characteristic of a standard color signal, and a linear standard color signal calculation unit extracting the gamma characteristic corresponding to a color signal from the gamma characteristic storage unit to compensate for a non-linear control component of the non-linear standard color signal with the retrieved (extracted) gamma characteristic and converting the non-linear standard color signal into a linear standard color signal.

The color signal processing device of the multi-primary color display includes a tristimulus value calculation unit calculating tristimulus values (X, Y, Z) of the non-linear standard color signal, a display primary control signal calculation unit calculating a control signal of each display primary to represent the non-linear standard color signal with a number of display primaries, and a control unit (controller) setting the control signal of each display primary calculated by the display primary control signal calculation unit as a new display primary control signal of each display primary to display the color signal. The tristimulus value calculation unit retrieves from the tristimulus value converting constant storage unit the tristimulus value converting constant corresponding to the converted linear standard color signal and calculates the tristimulus values (X, Y, Z) based on the converted linear standard color signal and the retrieved tristimulus value converting constant.

The display primary control signal calculation unit includes a display primary linear control signal (linearity and intensity) calculation unit calculating a linear control signal of each display primary and a display primary non-linear control signal (non-linearity and intensity) calculation unit calculating a non-linear control signal of each display primary. The display primary linear control signal calculation unit calculates the linear control signal of each display primary based on the following formula when driving the tristimulus values (X, Y, Z) with the display primaries:

$$\begin{vmatrix} X \\ Y \\ Z \end{vmatrix} = P \cdot K \cdot C,$$

where $$P = \begin{vmatrix} x_1 & x_2 & \dots & x_{Q-1} & x_Q \\ y_1 & y_2 & \dots & y_{Q-1} & y_Q \\ z_1 & z_2 & \dots & z_{Q-1} & z_Q \end{vmatrix},$$

$$K = \begin{vmatrix} k_1 & 0 & \dots & \dots & \dots & 0 \\ 0 & k_2 & 0 & \dots & \dots & \dots \\ \dots & 0 & \dots & 0 & \dots & \dots \\ \dots & \dots & 0 & \dots & 0 & \dots \\ \dots & \dots & \dots & 0 & k_{Q-1} & 0 \\ 0 & \dots & \dots & \dots & 0 & k_Q \end{vmatrix},$$

$$C = \begin{vmatrix} c_1 \\ c_2 \\ \dots \\ c_{Q-1} \\ c_Q \end{vmatrix},$$

the matrix $(X\ Y\ Z)^T$ being a 3×1 matrix of the tristimulus values (X, Y, Z), the number of display primaries being Q, the matrix (P) being a matrix of unique CIE-xyz chromaticity of each channel, the matrix (K) being a reference matrix to determine a color temperature and white brightness of a display white, and the matrix (C) being the linear control signal for each of the display primaries, respectively. The display primary linear control signal calculation unit calculates the matrix (C) based on an inverse matrix of multiplication of the matrixes P and K (i.e., $\{PK\}^{-1}$) and the matrix $(X\ Y\ Z)^T$ when the number of the display primaries is three (3).

The display primary linear control signal calculation unit calculates the linear control signal of an ith display primary of the display primaries by the following formula when the number of the display primaries is more than three (3):

$$C_i = a_i \cdot X + b_i \cdot Y + c_i \cdot Z (i=1,2,\ldots, Q),$$

where $a_i$, $b_i$ and $c_i$ are respective proportional constants when the ith display primary is represented in the tristimulus values (X, Y, Z).

The color signal processing device further includes a proportional constant storage unit storing the proportional constants $a_i$, $b_i$ and $c_i$. The tristimulus value calculation unit combines the linear control signal of certain display primaries ($C_1$ through $C_Q$) at an equal interval, calculates the tristimulus values (X, Y, Z) corresponding to the combination of the linear control signal of the respective display primaries, and the display primary linear control signal calculation unit calculates the proportional constants $a_i$, $b_i$ and $c_i$, based on the linear control signal (Ci) of one display primary of the certain display primaries and the tristimulus values (X, Y, Z).

The display primary linear control signal calculation unit calculates the Q×3 matrix (C) based on the calculated linear control signal of the ith display primary, the Q×3 matrix (C) being:

$$\begin{vmatrix} C_1 \\ C_2 \\ \ldots \\ C_{Q-1} \\ C_Q \end{vmatrix} = \begin{vmatrix} a_1 & b_1 & c_1 \\ a_2 & b_2 & c_2 \\ \ldots & \ldots & \ldots \\ a_{Q-1} & b_{Q-1} & c_{Q-1} \\ a_Q & b_Q & c_Q \end{vmatrix} \cdot \begin{vmatrix} X \\ Y \\ Z \end{vmatrix}.$$

Also provided is an electro-optical characteristic storage unit storing electro-optical characteristic of the multi-primary color display, the display primary non-linear control signal calculation unit calculates the non-linear control signal corresponding to the linear control signal of the ith display primary which is calculated based on the electro-optical characteristic, and a matrix CN of the non-linear control signal corresponding to the matrix (C).

The control unit sets the control signal of each display primary according to the calculated matrix (CN) of the non-linear control signal.

As a result, the color signal processing apparatus for the multi-primary display according to the present invention is not only capable of achieving the display white by more than four display primaries but is also capable of displaying the color signals of the almost entire natural color gamut according to the number of primaries as provided and the setting of the color coordinates.

The above and other objects are achieved by providing a method of processing a color signal of a multi-primary color display according to another embodiment of the present invention. The method includes calculating tristimulus values (X, Y, Z) of the input non-linear standard color signal, calculating the control signal of each display primary to represent the color signal with a number of the display primaries Q, and setting a display primary control signal of each display primary with the control signal calculated in the display primary control signal calculating operation to display the input non-linear standard color signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
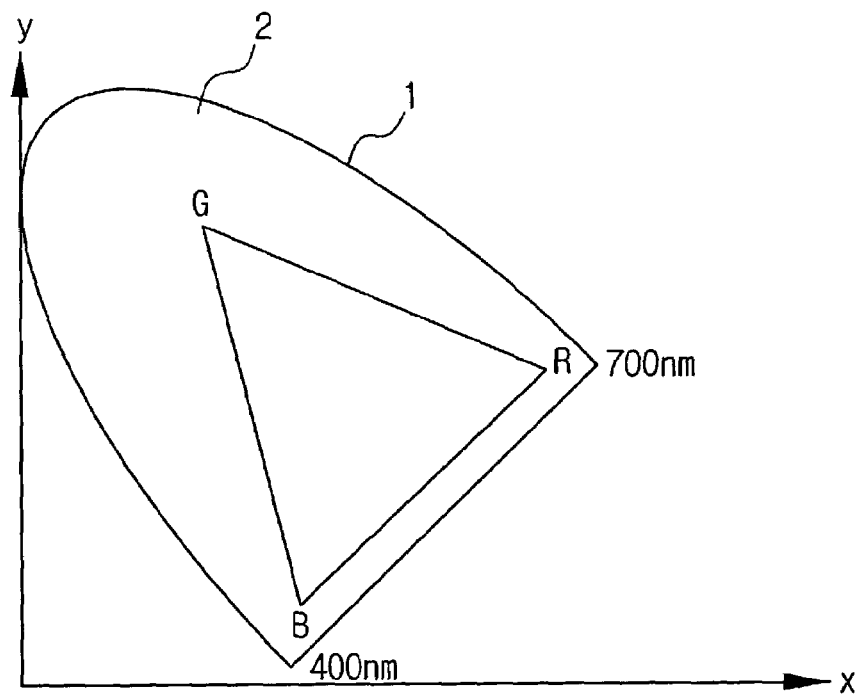
FIG. 1 is a view showing CIE color coordinates.
Figure 2:
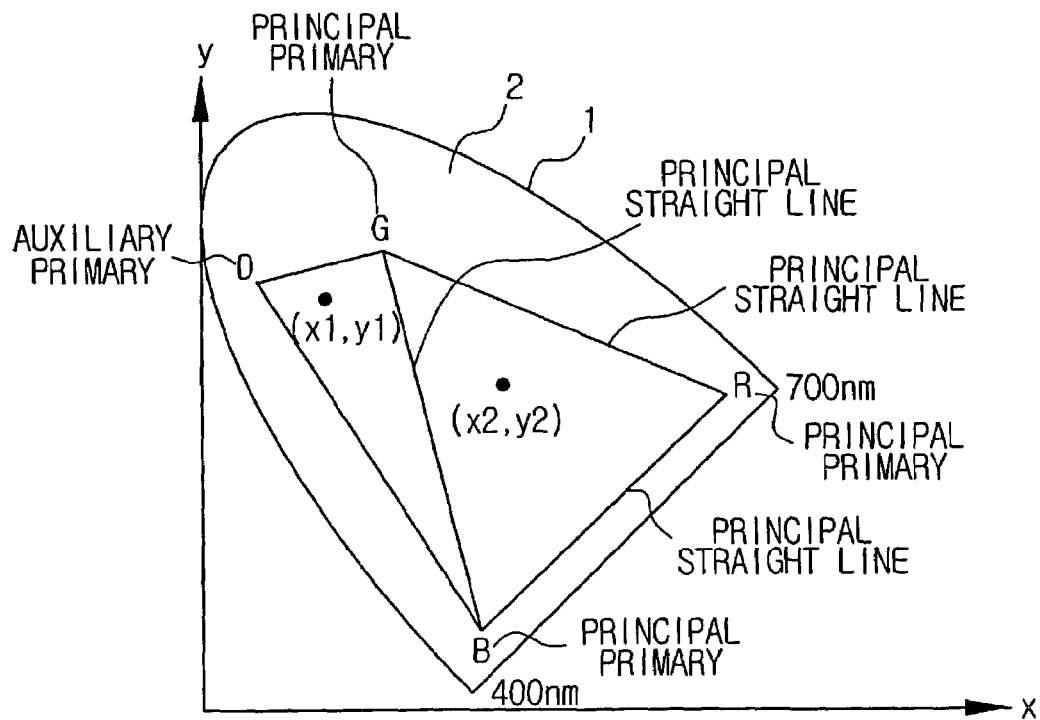
FIG. 2 is a view showing a conventional color driving method of a display system that has four primary colors.
Figure 3:
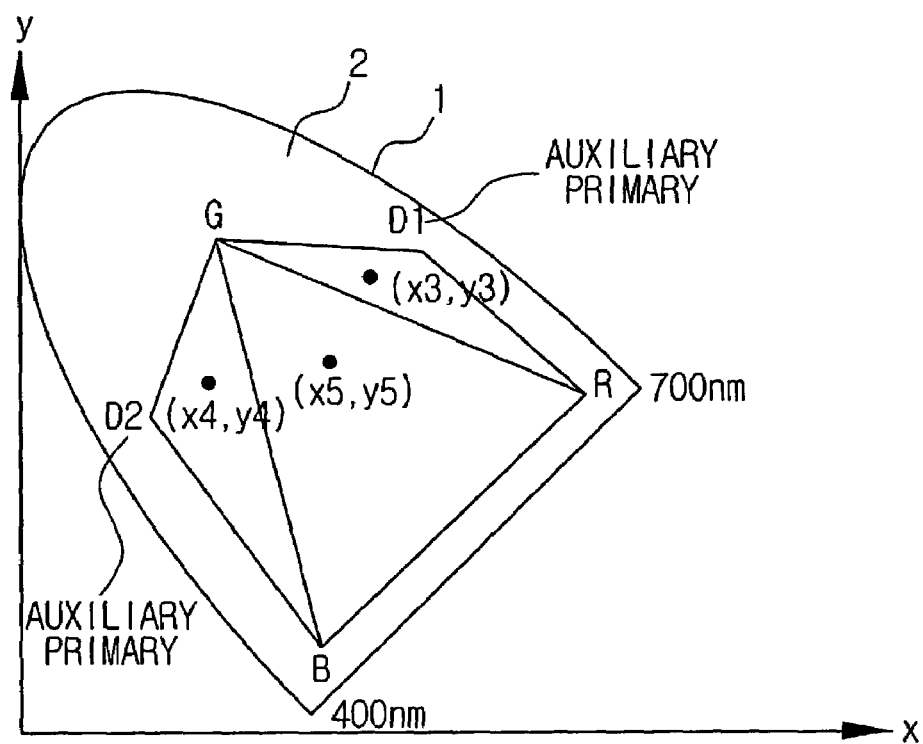
FIG. 3 is a view showing a conventional color driving method of a display system that has five primary colors.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

The preferred embodiment of the present invention will now be described with reference to the drawings.

Figure 4:
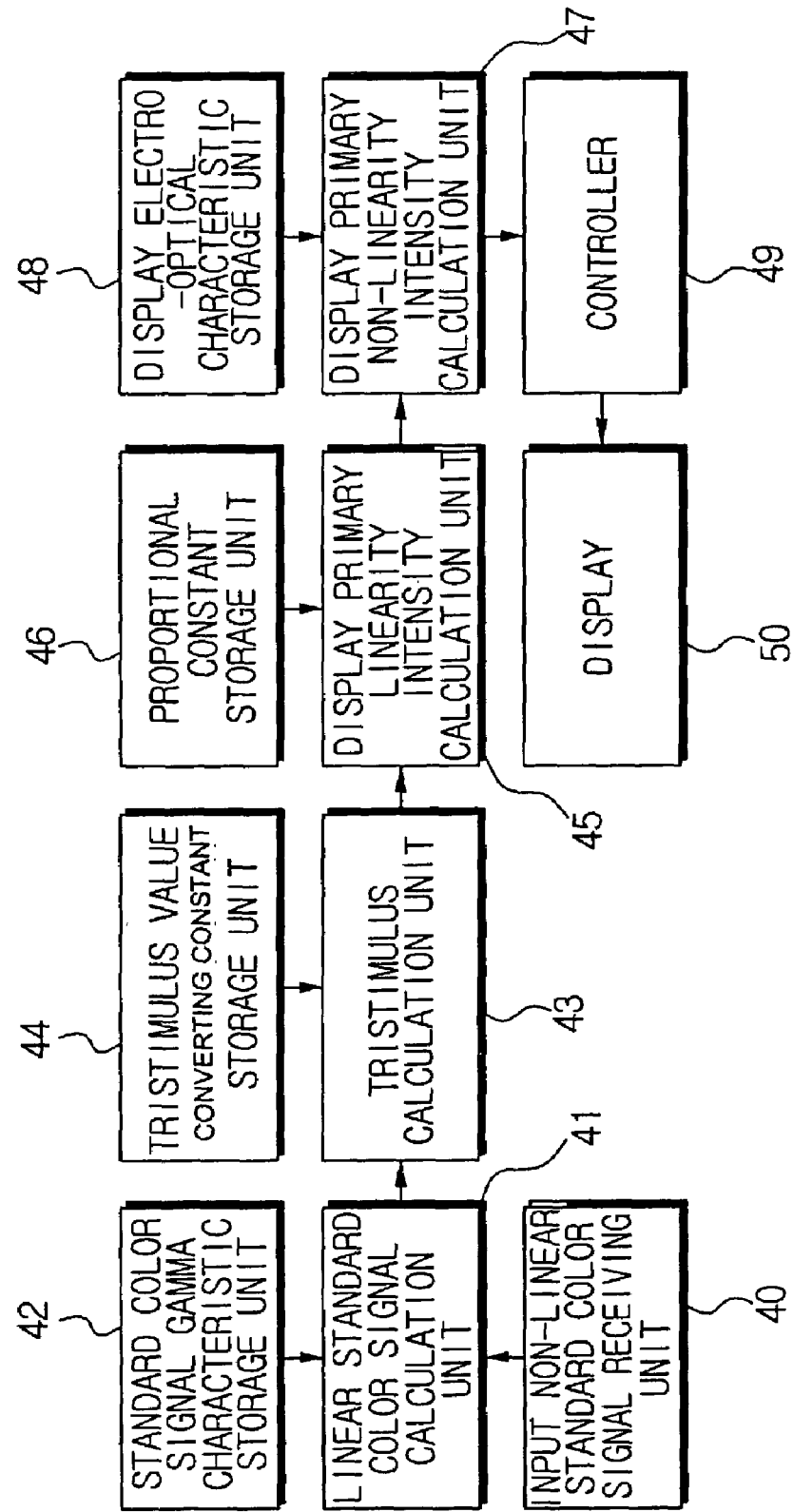
FIG. 4 is a block diagram schematically showing a color signal processing apparatus for a multi-primary display according to an embodiment of the present invention.

FIG. 4 is a block diagram schematically showing a color signal processing apparatus for a multi-primary display according to an embodiment of the present invention. Referring to FIG. 4, the color signal processing apparatus for the multi-primary display includes a non-linear standard color signal receiving unit 40, a linear standard color signal calculation unit 41, a gamma characteristic storage unit 42, a tristimulus value calculation unit 43, a tristimulus value converting constant storage unit 44, a display primary linear control signal (linearity intensity) calculation unit 45, a proportional constant storage unit 46, a display primary non-linear control signal (non-linearity intensity) calculation unit 47, an electro-optical characteristic storage unit 48, and a controller 49.

The non-linear standard color signal receiving unit 40 receives an input non-linear standard color signal which is not applied with a gamma correction of a cathode ray tube (CRT) display or not compatible with the CRT display. The linear standard color signal calculation unit 41 retrieves a gamma characteristic, which corresponds to the input non-linear standard color signal, from the gamma characteristic storage unit 42 storing gamma characteristics of standard color signals. The linear standard color signal calculation unit 41 converts the input non-linear standard color signal into a linear standard color signal by compensating for a non-linear control component of the input non-linear standard color signal in response to the gamma characteristic.

For example, a national television system committee TV (NTSC-TV) system converts the input non-linear standard color signal into the linear standard color signal by inverse-compensating for the gamma 2.2 of a cathode ray tube (CRT) display with linear RGB components. The gamma characteristics vary according to regulations on the standard color signal (PAL TV, sRGB, etc.). According to the regulations on the standard color signal, the linear standard color signal calculation unit 41 retrieves the corresponding gamma characteristic from the gamma characteristic storage unit 42.

The tristimulus value calculation unit 43 calculates tristimulus values (X, Y, Z) of the linear standard color signal that is converted from the input non-linear standard color signal by the linear standard color signal calculating unit 41. In this case, the tristimulus value calculation unit 43 retrieves a trimulus value converting constant, which corresponds to the linear standard color signal (converted input non-linear standard color signal), from the tristimulus value converting constant storage unit 44 that stores tristimius value converting constants. Due to the different regulations on the standard color signals (NTSC TV, PAL TV, sRGB, etc.), the tristimulus value converting constants of the linear standard color signal differ from each other, and accordingly, the tristimulus value converting constant storage unit 44 stores various tristimulus value converting constants according to the various regulations on the standard color signals. The tristimulus value calculation unit 43 calculates the tristimulus values (X, Y, Z) based on the linear standard color signal and the retrieved tristimulus value converting constants.

When the display primary linear control signal calculation unit 45 receives the tristimulus values (X, Y, Z) calculated by the tristimulus value calculation unit 43 corresponding to respective ones of a number of primary colors (display primaries), a linear control signal required for each of the display primaries is calculated by retrieving a proportional constant corresponding to the tristimulus values (X, Y, Z) of the linear standard color signal from the proportional constant storage unit 46 and then by matrix-transforming the tristimulus values (X, Y, Z) of the linear standard color signal in response to the retrieved proportional constant. The proportional constants stored in the proportional constant storage unit 46 are turned into different values according to the number of the display primaries. Here, the display primary linear control signal calculation unit 45 can calculate the proportional constant based on the tristimulus values (X, Y, Z) and a linear control signal Ci of one display primary of certain display primaries, and then calculate the linear control signal required for each of the Q display primaries according to the calculated proportional constant.

The display primary non-linear control signal calculation unit 47 retrieves an electro-optical characteristic from the electro-optical characteristic storage unit 48 that stores electro-optical characteristics of the display 50. The display primary non-linear control signal calculation unit 47 calculates a non-linear control signal of the display primary corresponding to the linear control signal of the calculated display primary based on an inverse function of the retrieved electro-optical characteristics. The non-linear control signal of the display primary is used to directly control the display 50.

In order to display a color signal corresponding to the input non-linear standard color signal, the controller 49 sets display primary control signals of the respective display primaries with the non-linear control signals calculated by the display primary non-linear control signal calculation unit 47. The display 50 displays the color signal corresponding to the input non-linear standard color signal with the display primary control signal set by the controller 49.

Figure 5:
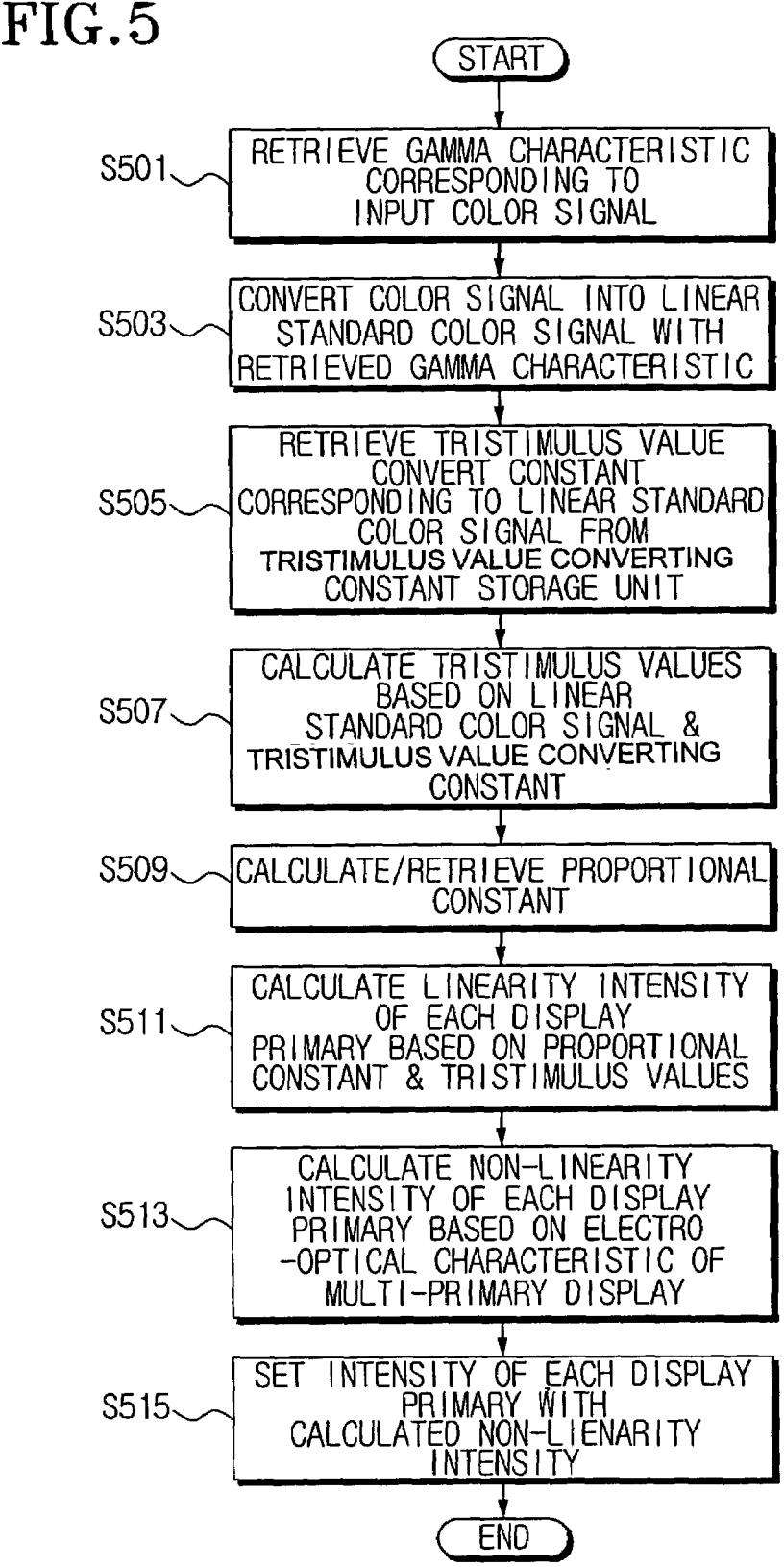
FIG. 5 is a flowchart showing a color signal processing method of the multi-primary display color signal processing apparatus of FIG. 4.

FIG. 5 is a flowchart showing a color signal processing method of the color signal processing apparatus for the multi-primary display of FIG. 4. Referring to FIG. 5, an operation of the color signal processing apparatus for the multi-primary display will be described below.

When the non-linear standard color signal receiving unit 40 receives the input non-linear standard color signal, the linear standard color s gamma characteristic corresponding to the input non-linear standard color signal from the gamma characteristic storage unit 42 in operation S501. The linear standard color signal calculation unit 41 compensates for the non-linear control component of the input non-linear color signal with the retrieved gamma characteristic and converts the input non-linear standard color signal into the linear standard color signal in operation S503. The converted input non-linear standard color signal, that is the linear standard color signal, is transmitted to the tristimulus calculation unit 43.

The tristimulus calculation unit 43 retrieves the tristimulus value converting constant corresponding to the linear standard color signal from the tristimulus value converting constant storage unit 44 in operation S505. The tristimulus value calculation unit 43 calculates the tristimulus values (X, Y, Z) of the converted input non-linear standard color signal (linear standard color signal) based on the retrieved tristimulus value converting constant and the linear standard color signal received from the linear standard color signal calculation unit 41 in operation S507. The tristimulus values (X, Y, Z) calculated by the tristimulus value calculation unit 43 are transmitted to the display primary linear control signal calculation unit 45.

The display primary linear control signal calculation unit 45 receives the tristimulus values (X, Y, Z) of the linear standard color signal from the tristimulus value calculation unit 43. Further, the display primary linear control signal calculation unit 45 retrieves from the proportional constant storage unit 46 the proportional constant for use when the display primary is displayed with the tristimulus values (X, Y, Z) in operation S509. The proportional constant can be calculated in the display primary linear control signal calculation unit 45.

The display primary linear control signal calculation unit 45 calculates the linear control signal required for each of the display primaries to display the input non-linear standard color signal with the Q display primaries based on the tristimulus values (X, Y, Z) calculated by the tristimulus value calculation unit 43 and the proportional constants in operation S511. When receiving the tristimulus values (X, Y, Z) corresponding to respective ones of the display primaries, the display primary linear control signal calculation unit 45 calculates the linear control signal (linearity and intensity) of each of the display primaries based on a result of the following equation 4 in operation S511:

$$\begin{pmatrix} X \\ Y \\ Z \end{pmatrix} = P \cdot K \cdot C,$$

Equation 4 where

-continued $$p = \begin{pmatrix} x_1 & x_2 & \ldots & x_{Q-1} & x_Q \\ y_1 & y_2 & \ldots & y_{Q-1} & y_Q \\ z_1 & z_2 & \ldots & z_{Q-1} & z_Q \end{pmatrix},$$

$$K = \begin{pmatrix} k_1 & 0 & \ldots & \ldots & \ldots & 0 \\ 0 & k_2 & 0 & \ldots & \ldots & \ldots \\ \ldots & 0 & \ldots & 0 & \ldots & \ldots \\ \ldots & \ldots & 0 & \ldots & 0 & \ldots \\ \ldots & \ldots & \ldots & 0 & k_{Q-1} & 0 \\ 0 & \ldots & \ldots & \ldots & 0 & k_Q \end{pmatrix},$$

$$C = \begin{pmatrix} C_1 \\ C_2 \\ \ldots \\ C_{Q-1} \\ C_Q \end{pmatrix},$$

and where the matrix $(X\ Y\ Z)^T$ is a matrix of tristimulus values, the matrix (P) is a matrix of particular CIE-xyz color coordinates of each channel, the matrix (k) is a standard matrix to determine a color temperature and a white luminance of a display white, Q is the number of the display primaries, and the matrix (C) is a matrix representing the linear control signal of each of the display primaries.

Here, when the number of the display primaries (Q) is three (3), the display primary linear control signal calculation unit 45 calculates the matrix (C) that represents the linear control signal of each of the display primaries by multiplying an inverse matrix ($\{PK\}^{-1}$) of a multiplication matrix of the matrix (P) and the matrix (K) by the matrix (X Y Z )$^T$ representing the tristimulus values. If the number of the display primaries (Q) is greater than three (3), however, first, the display primary linear control signal calculation unit 45 calculates the linear control signal of an ith display primary by the following equation 5:

$$C_i = a_i \cdot X + b_i \cdot Y + c_i \cdot Z (i=1,2,\ldots,Q), \quad \text{Equation 5}$$

where $a_i$, $b_i$, $c_i$ are proportional constants of the tristimulus values (X, Y, Z) when the ith display primary is displayed with the tristimulus values (X, Y, Z). The proportional constants $a_i$, $b_i$, $c_i$ are stored in the proportional constant storage unit 46. The proportional constants may not be obtained by a general method of obtaining inverse matrixes because unlike the three channels, the multiplication matrix of the matrix (P) and the matrix (K) does not result in a 3×3 square matrix.

Accordingly, the equation 4 is first used to obtain the proportional constant for use when the number of the display primaries Q is greater than three (3). More specifically, the tristimulus value calculation unit 43 combines the linear control signals of particular display primaries from $C_1$ to $C_Q$ at an equal interval, and calculates the tristimulus values (X, Y, Z) corresponding to the combination of the respective linear control signals of the display primaries. The calculated tristimulus values (X, Y, Z) are stored in a data table. Accordingly, the data table has three XYZ values with respect to the Q number of combinations in a form of XYZ=f($C_1$, $C_2$, . . . , $C_Q$). In a next operation, the data table is re-arranged such that each $C_i$ is re-arranged to a function of the calculated tristimulus values. That is, the Q number of data tables in a form of $C_i$=f(X, Y, Z) are created. Then, the proportional constants ($a_i$, $b_i$, $c_i$) are obtained by approximating the equation 5 for each of the data tables by linear approximation.

The display primary linear control signal calculation unit 45 calculates the proportional constants ($a_i$, $b_i$, $c_i$) based on the linear control signal ($C_i$) of one of the particular display primaries and the corresponding tristimulus values (X, Y, Z).

The display primary linear control signal calculation unit 45 calculates the Q×3 matrix (C) as the following equation 6 based on the linear control signal of the ith display primary calculated by the equation 5:

$$\begin{pmatrix} C_1 \\ C_2 \\ \ldots \\ C_{Q-1} \\ C_Q \end{pmatrix} = \begin{pmatrix} a_1 & b_1 & c_1 \\ a_2 & b_2 & c_2 \\ \ldots & \ldots & \ldots \\ a_{Q-1} & b_{Q-1} & c_{Q-1} \\ a_Q & b_Q & c_Q \end{pmatrix} \cdot \begin{pmatrix} X \\ Y \\ Z \end{pmatrix}. \quad \text{Equation 6}$$

The matrix (C) calculated by the display primary linear control signal calculation unit 45 is transmitted to the display primary non-linear control signal calculation unit 47. The display primary non-linear control signal calculation unit 47 retrieves the electro-optical characteristic information about the display 50 from the electro-optical characteristic storage unit 48 of the multi-primary display 50. The display primary non-linear control signal calculation unit 47 calculates the non-linear control signal (non-linearity intensity) of each of the display primaries based on the retrieved electro-optical characteristic of the multi-primary display 50 in operation S513. For example, in a case of a CRT display, the electro-optical characteristic is γ=2.2, and the linear control signal (C) and the non-linear control signal ($C_N$) are expressed by the following equation 7:

$$C_N = C^{1/\gamma} \quad \text{Equation 7}$$

The controller 49 sets the non-linear control signal of each of the display primaries as the display primary control signal according to the matrix ($C_N$) of the calculated non-linear control signal in operation S515. The display 50 displays the input non-linear standard color signals according to the display primary control signals of the display primaries set by the controller 49. Accordingly, the color signal processing of the multi-primary display is completed.

Figure 6:
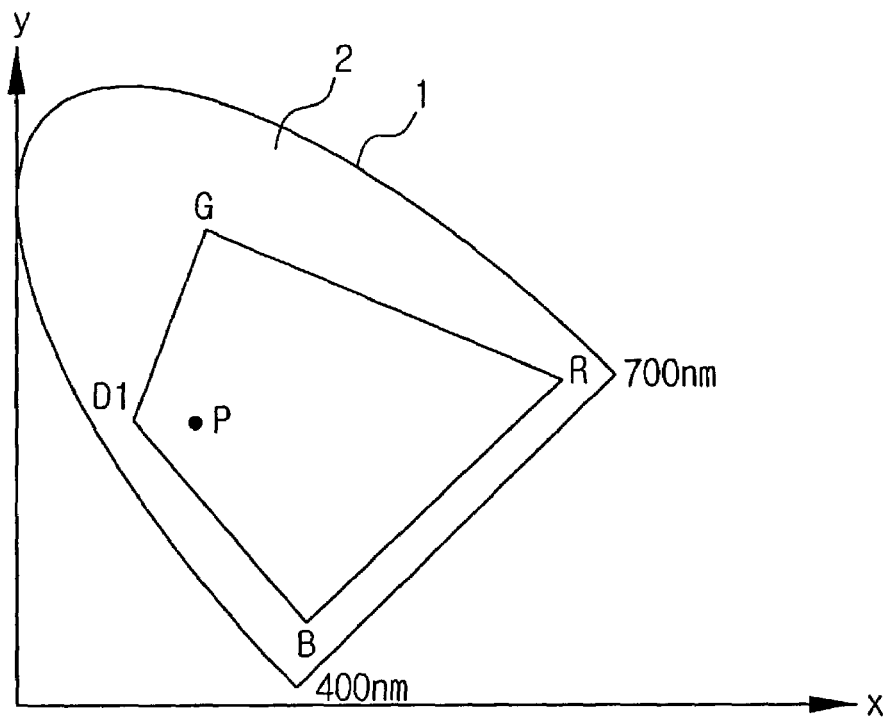
FIG. 6 is a view showing four primary colors of CIE color coordinates according to the color signal processing method in the display system of FIG. 4.

FIG. 6 is a view showing four display primaries of the color driving method in the display system of FIG. 4. Referring to FIG. 6, the input non-linear standard color signal (P) is included in a quadrilateral connecting four display primaries.

When the input non-linear standard color signal is input, the linear standard color signal calculation unit 41 retrieves the corresponding gamma characteristic of the standard color signal from the gamma characteristic storage unit 42 in operation S501. The linear standard color signal calculation unit 41 compensates for the non-linear control input non-linear component of the standard color signal by using the retrieved gamma characteristic and converts the input non-linear standard color signal into the linear standard color signal in operation S503.

The tristimulus value calculation unit 43 retrieves the tristimulus value converting constant corresponding to the converted linear standard color signal from the tristimulus value converting constant storage unit 44 in operation S505. Further, the tristimulus value calculation unit 43 calculates the tristimulus values based on the retrieved tristimulus value converting constants and the converted linear standard color signals in operation S507. The calculated tristimulus values are transmitted to the display primary linear control signal calculation unit 45. The display primary linear control signal calculation unit 45 retrieves the proportional constants from the proportional constant storage unit 46 or calculates the proportional constants in operation S509. Based on the proportional constants and the tristimulus values, the display primary linear control signal calculation unit 45 calculates the linear control signal required for each of the display primaries to achieve the input non-linear standard color signals with four display primaries in operation S511.

The calculated linear control signal is transmitted to the display primary non-linear control signal calculation unit 47. The display primary non-linear control signal calculation unit 47 calculates the non-linear control signal based on the received linear control signal and the electro-optical characteristic of the multi-primary display in order to drive the display 50 in operation S513. The controller 49 sets the display primary control signal of each of the display primaries according to the calculated non-linear control signal in operation S515. The display 50 displays the input non-linear standard color signal with the set display primary control signals of the display primaries.

Figure 7:
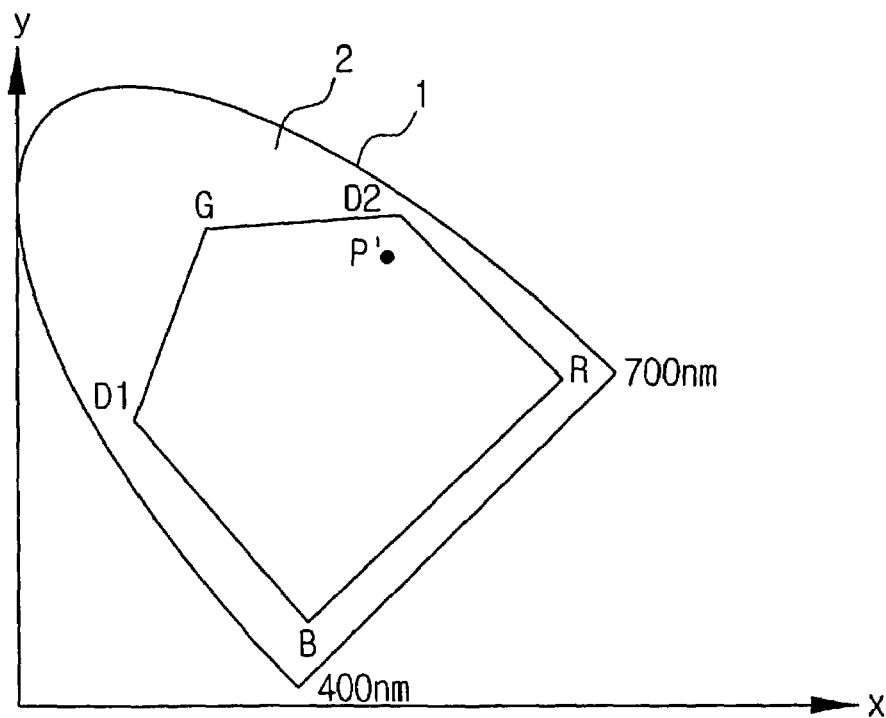
FIG. 7 is a view showing five primary colors of CIE color coordinates according to the color signal processing method in the display system of FIG. 4.

FIG. 7 is a view showing five display primaries of the color driving method in the display system of FIG. 4. FIG. 7 shows a widened displayable color region when there are a greater number of display primaries provided to the display system, and also, the input non-linear standard color signals are processed with more simplicity in terms of circuit operation.

Accordingly, by calculating the display primary control signal of each display primary according to the number of the display primaries, even the display white by more than four display primaries can be achieved.

As described above, the color signal processing apparatus for multi-primary display according to the present invention is not only capable of achieving the display white by more than four display primaries, but also can display the color signals of the entire color gamut according to the number of display primaries being provided and the settings for the respective color coordinates. Additionally, the input color signals are processed with a simpler circuit.

While the invention has been shown and described with reference to the preferred embodiment thereof, it will be understood by those skilled in the art that various changes in form and details may be made therein without departing from the sprit and scope of the invention as defined in the appended claims and equivalents.

What is claimed is:

1. A color signal processing device receiving an input color signal having display primaries in a multi-primary color display, comprising:
    a tristimulus value calculation unit calculating tristimulus values (X, Y, Z) of the color signal;
    a display primary control signal calculation unit calculating a control signal of each display primary to represent the color signal with a number of display primaries based on the calculated tristimulus values (X, Y, Z) of the color signal;
    a control unit setting a display control signal of each display primary with the calculated control signal calculated by the display primary control signal calculation unit to display the color signal on the multi-primary color display;
    a gamma characteristic storage unit storing a gamma characteristic of a standard color signal; and
    a linear standard color signal calculation unit extracting the gamma characteristic corresponding to the color signal from the gamma characteristic storage unit, and compensating for a non-linear control component of the color signal with the retrieved gamma characteristic and converting the color signal into a linear standard color signal;
    wherein at least one of the number of display primaries is an auxiliary primary color D.

2. The color signal processing device of claim 1, wherein the tristimulus value calculation unit calculates the tristimulus values (X, Y, Z) of the linear standard color signal.

3. The color signal processing device of claim 2, further comprising:
    a tristimulus value converting constant storage unit storing a tristimulus value converting constant with respect to the linear standard color signal.

4. The color signal processing device of claim 3, wherein the tristimulus value calculation unit retrieves from the tristimulus value converting constant storage unit the tristimulus value converting constant corresponding to the linear standard color signal and calculates the tristimulus values (X, Y, Z) based on the linear standard color signal and the retrieved tristimulus value converting constant.

5. A color signal processing device receiving an input color signal having display primaries in a multi-primary color display, comprising:
    a tristimulus value calculation unit calculating tristimulus values (X, Y, Z) of the color signal;
    a display primary control signal calculation unit calculating a control signal of each display primary to represent the color signal with a number of display primaries based on the calculated tristimulus values (X, Y, Z) of the color signal; and
    a control unit setting a display control signal of each display primary with the calculated control signal calculated by the display primary control signal calculation unit to display the color signal on the multi-primary color display;
    wherein at least one of the number of display primaries is an auxiliary primary color D;
    wherein the display primary control signal calculation unit comprises:
    a display primary linear control signal calculation unit calculating a linear control signal of each display primary; and
    a display primary non-linear control signal calculation unit calculating a non-linear control signal of each display primary based on an electro-optical characteristic of the multi-primary display and the linear control signal.

6. The color signal processing device of claim 5, wherein the display primary linear control signal caculation unit calculates the linear control signal of each display primary based on the following formula when receiving the tristimulus values (X, Y, Z) corresponding to respective ones of the display primaries:

$$\begin{vmatrix} X \\ Y \\ Z \end{vmatrix} = P \cdot K \cdot C,$$

-continued where $$p = \begin{vmatrix} x_1 & x_2 & \cdots & x_{Q-1} & x_Q \\ y_1 & y_2 & \cdots & y_{Q-1} & y_Q \\ z_1 & z_2 & \cdots & z_{Q-1} & z_Q \end{vmatrix},$$

$$K = \begin{vmatrix} k_1 & 0 & \cdots & \cdots & \cdots & 0 \\ 0 & k_2 & 0 & \cdots & \cdots & \cdots \\ \cdots & 0 & \cdots & 0 & \cdots & \cdots \\ \cdots & \cdots & 0 & \cdots & 0 & \cdots \\ \cdots & \cdots & \cdots & 0 & k_{Q-1} & 0 \\ 0 & \cdots & \cdots & \cdots & 0 & k_Q \end{vmatrix},$$

$$C = \begin{vmatrix} C_1 \\ C_2 \\ \cdots \\ C_{Q-1} \\ C_Q \end{vmatrix},$$

the matrix $(X\ Y\ Z)_T$ being a 3×1 matrix of the tristimulus values (X, Y, Z), Q being the number of the display primaries, the matrix (P) being a matrix of unique CIE-xyz chromaticity of each channel, the matrix (K) being a reference matrix to determine a color temperature and a white brightness of a display white, and the matrix (C) being the linear control signal for each of the display primaries, respectively.

7. The color signal processing device of claim 6, wherein the display primary linear control signal calculation unit calculates the matrix (C) based on an inverse matrix of multiplication of the matrixes P and K(i.e., $\{PK\}^{-1}$), and the matrix $(X\ Y\ Z)^T$ when the number of the display primaries is three (3).

8. The color signal processing device of claim 6, wherein the display primary linear control signal calculation unit calculates the linear control signal of an ith display primary of the display primaries by the following formula when the number of the display primaries is more than three (3):

$$C_i = a_i \cdot X + b_i \cdot Y + c_i \cdot Z (i=1,2,\ldots,Q),$$

where $a_i$, $b_i$ and $c_i$ are respective proportional constants when the ith display primary is represented by the tristimulus values (X, Y, Z).

9. The color signal processing device of claim 8, wherein the tristimulus value calculation unit combines linear control signals of the display primaries ($C_1$ through $C_Q$) at an equal interval and calculates the tristimulus values (X, Y, Z) corresponding to a combination of the linear control signals of the respective display primaries, and the display primary linear control signal calculation unit calculates the proportional constants $a_i$, $b_i$ and $c_i$, based on the linear control signal (Ci) of one of the display primaries and the tristimulus values (X, Y, Z).

10. The color signal processing device of claim 8, further comprising:
a proportional constant storage unit storing the proportional constants $a_i$, $b_i$ and $c_i$.

11. The color signal processing device of claim 10, wherein the display primary linear control signal calculation unit calculates a Q×3 matrix (C) based on the calculated linear control signal of the ith display primary, the Q×3 matrix (C) being:

$$\begin{vmatrix} C_1 \\ C_2 \\ \cdots \\ C_{Q-1} \\ C_Q \end{vmatrix} = \begin{vmatrix} a_1 & b_1 & c_1 \\ a_2 & b_2 & c_2 \\ \cdots & \cdots & \cdots \\ a_{Q-1} & b_{Q-1} & c_{Q-1} \\ a_Q & b_Q & c_Q \end{vmatrix} \cdot \begin{vmatrix} X \\ Y \\ Z \end{vmatrix}.$$

12. The color signal processing device of claim 11, further comprising an electro-optical characteristic storage unit storing an electro-optical characteristic of the multi-primary color display, and the display primary non-linear control signal calculation unit calculates the non-linear control signal corresponding to the linear control signal of the ith display primary which is calculated based on the electro-optical characteristic and a matrix $C_N$ of the non-linear control signal corresponding to the Q×3 matrix (C).

13. The color signal processing device of claim 12, wherein the control unit sets a display control signal of each display primary according to the calculated matrix ($C_N$) of the non-linear control signal.

14. A method of processing an input color signal in a multi-primary color display of a color signal processing device, comprising:
calculating by the color signal processing device tristimulus values (X, Y, Z) of the color signal;
calculating by the color signal processing device a control signal of each display primary to represent the color signal with a number of display primaries in response to the tristimulus values (X, Y, Z);
setting by the color signal processing device a display primary control signal of each display primary with the calculated control signal to display the color signal;
extracting by the color signal processing device a gamma characteristic corresponding to the color signal from a gamma characteristic storage unit that stores the gamma characteristic of a standard color signal; and
compensating by the color signal processing device for a non-linear control component of the color signal with the extracted gamma characteristic and then converting the color signal into a linear standard color signal;
wherein at least one of the number of display primaries is an auxiliary primary color D.

15. The method of claim 14, wherein the calculating of the tristimulus values comprises calculating the tristimulus values (X, Y, Z) of the converted linear standard color signal.

16. The method of claim 15, further comprising:
retrieving a tristimulus value converting constant corresponding to the converted linear standard color signal from a tristimulus value converting constant storage unit which stores the tristimulus converting constant corresponding to the linear standard color signal.

17. The method of claim 16, wherein the calculating of the tristimulus values comprises calculating the tristimulus values (X, Y, Z) based on the converted linear standard color signal and the retrieved tristimulus value converting constant.

18. A method of processing an input color signal in a multi-primary color display of a color signal processing device, comprising:
calculating by the color signal processing device tristimulus values (X, Y, Z) of the color signal;
calculating by the color signal processing device a control signal of each display primary to represent the color signal with a number of display primaries in response to the tristimulus values (X, Y, Z); and setting a display primary control signal of each display primary with the calculated control signal to display the color signal;

wherein at least one of the number of display primaries is an auxiliary primary color D;

wherein the calculating of the control signal comprises:

calculating a linear control signal of each display primary; and calculating a non-linear control signal of each display primary based on an electro-optical characteristic of the multi-primary display and the linear control signal.

19. The method of claim 18, wherein the calculating of the linear control signal comprises calculating the linear control signal of each display primary when the tristimulus values (X, Y, Z) are driven with the display primaries based on the following formula:

$$\begin{vmatrix} X \\ Y \\ Z \end{vmatrix} = P \cdot K \cdot C,$$

where $$P = \begin{vmatrix} x_1 & x_2 & \cdots & x_{Q-1} & x_Q \\ y_1 & y_2 & \cdots & y_{Q-1} & y_Q \\ z_1 & z_2 & \cdots & z_{Q-1} & z_Q \end{vmatrix},$$

$$K = \begin{vmatrix} k_1 & 0 & \cdots & \cdots & \cdots & 0 \\ 0 & k_2 & 0 & \cdots & \cdots & \cdots \\ \cdots & 0 & \cdots & 0 & \cdots & \cdots \\ \cdots & \cdots & 0 & \cdots & 0 & \cdots \\ \cdots & \cdots & \cdots & 0 & k_{Q-1} & 0 \\ 0 & \cdots & \cdots & \cdots & 0 & k_Q \end{vmatrix},$$

$$C = \begin{vmatrix} C_1 \\ C_2 \\ \cdots \\ C_{Q-1} \\ C_Q \end{vmatrix},$$

the matrix $(X\ Y\ Z)^T$ being a 3×1 matrix of the tristimulus values (X, Y, Z), Q being the number of the display primaries, the matrix (P) being a matrix of particular CIE-xyz chromaticity of each channel, the matrix (K) being a reference matrix for determining a color temperature and white brightness of a display white, and the matrix (C) being the linear control signal for each of the Q number of display primaries, respectively.

20. The method of claim 19, wherein the calculating of the linear control signal comprises calculating the matrix (C) based on an inverse matrix of multiplication of the matrixes P and K, i.e., $(\{PK\}^{31\ 1})$, and the matrix $(X\ Y\ Z)^T$ when the number of display primaries is three (3).

21. The method of claim 19, wherein the the calculating of linear control signal comprises calculating the linear control signal of the ith display primary of the display primaries by the following formula when the Q number of the display primaries is more than three (3):

$C_i = a_i \cdot X + b_i \cdot Z (i=1,2,\ldots,Q)$, where $a_i$, $b_i$ and $c_i$, are proportional constants when an ith display primary is represented in the tristimulus values (X, Y, Z).

22. The method of claim 21, further comprising:

retrieving the proportional constants from a proportional constant storage unit that stores the proportional constants $a_i$, $b_i$ and $c_i$.

23. The method of claim 21, wherein the calculating of the tristimulus value comprises combining linear control signals of display primaries ($C_1$ through $C_Q$) at an equal interval and calculating the tristimulus values (X, Y, Z) corresponding to a combination of the linear control signals of the respective display primaries, and the calculating of the linear control signal comprises calculating the proportional constants $a_i$, $b_i$ and $c_i$ based on the linear control signal ($C_i$) of one display primary of the certain display primaries and based on the tristimulus values (X, Y, Z).

24. The method of claim 21, wherein the calculating of the linear control signal comprises calculating a Q×3 matrix (C) based on the calculated linear control signal of ith display primary, the Q×3 matrix (C) being:

$$\begin{vmatrix} C_1 \\ C_2 \\ \cdots \\ C_{Q-1} \\ C_Q \end{vmatrix} = \begin{vmatrix} a_1 & b_1 & c_1 \\ a_2 & b_2 & c_2 \\ \cdots & \cdots & \cdots \\ a_{Q-1} & b_{Q-1} & c_{Q-1} \\ a_Q & b_Q & c_Q \end{vmatrix} \cdot \begin{vmatrix} X \\ Y \\ Z \end{vmatrix}.$$

25. The method of claim 24, wherein the calculating of the non-linear control signal comprises calculating the non-linear control signal corresponding to the linear control signal of the ith display primary which is calculated based on an electro-optical characteristic of the multi-primary color display and a matrix $C_N$ of the non-linear control signal corresponding to the Q×3 matrix (C).

26. The method of claim 25, wherein the setting of the control signal of each display primary comprises setting the calculated matrix ($C_N$) of the non-linear control signal as the control signal.

27. A color signal processing device for displaying an input color signal having display primaries and a non-linear control component in a multi-primary color display, comprising:

a linear standard color signal calculation unit having a gamma characteristic corresponding to the non-linear control component of the input color signal and calculating a linear standard color signal from the input color signal in response to the gamma characteristic;

a tristimulus value calculation unit having a tristimulus value converting constant corresponding to the linear standard color signal and calculating tristimulus values of the linear standard color signal in response to the converted linear standard color signal and the tristimulus value converting constant;

a display primary control signal calculation unit having a proportional constant and a display electro-optical characteristic corresponding to the linear standard color signal and calculating a display primary control signal of each display primary in response to the proportional constant, the display electro-optical characteristic, and the tristimulus values to represent the linear standard color signal with a number of display primaries; and a control unit controlling the multi-primary color display with the display primary control signal of each one of the display primaries to display the converted linear standard color signal corresponding to the input color signal on the multi-primary color display.

28. The color signal processing device of claim 27, further comprising:
- a gamma characteristic storage unit storing the gamma characteristic of a standard color signal;
- a tristimulus value converting constant storage unit storing the tristimulus value converting constant;
- a proportional constant storage unit storing the proportional constant; and
- a display electro-optical characteristic storing the display electro-optical characteristic.

29. The color signal processing device of claim 27, wherein the display primary control signal calculation unit comprises a display primary linear control signal calculation unit generating a linear control signal of each display primary of the converted linear standard color signal in response to the proportional constant.

30. The color signal processing device of claim 29, wherein the display primary control signal calculation unit comprises a display primary non-linear control signal calculation unit controlling a non-linear control signal of the converted linear standard color signal in response to the electro-optical characteristic and the linear control signal of each display primary.

31. The color signal processing device of claim 29, wherein the input color signal is a non-linear standard color signal different from the linear standard color signal, and the converted linear standard color signal is one of a NTSC-TV system, a PAL-TV system, and an sRGB system.

* * * * *

UNITED STATES PATENT AND TRADEMARK OFFICE
CERTIFICATE OF CORRECTION

PATENT NO.         : 7,199,839 B2                                Page 1 of 1
APPLICATION NO. : 10/241695
DATED              : April 3, 2007
INVENTOR(S)        : Moon-cheol Kim It is certified that error appears in the above-identified patent and that said Letters Patent is hereby corrected as shown below:

On The Title Page, Item -56- (FOREIGN PATENT DOCUMENTS), after
"JP         2001-60082        3/2001" add
--JP        2000-338950       12/2000
GB          2282928           04/1995--.

Column 12, Line 56, change "caculation" to --calculation--.

Column 13, Line 24, change "(X Y Z)$_T$" to --(X Y Z)$^T$--.

Column 13, Line 35, change "(i.e., $\{PK\}^{31\ 1}$)," to --(i.e., $\{PK\}^{-1}$),--.

Column 15, Line 56, change "($\{PK\}^{31\ 1}$)," to --($\{PK\}^{-1}$),--.

Column 15, Line 58, before "calculating" delete "the". (Second Occurrence)

Column 15, Line 63, change "$C_i = a_i \cdot X + b_i \cdot Z (i=1,2,...,Q)$," to
--$C_i = a_i \cdot X + b_i \cdot Y + c_i \cdot Z (i=1,2,...,Q)$,--.

Column 15, Line 65, after "$c_i$" delete ",".

Signed and Sealed this

Twenty-first Day of August, 2007

JON W. DUDAS
*Director of the United States Patent and Trademark Office*